(12) United States Patent
Kim

(10) Patent No.: US 12,413,161 B2
(45) Date of Patent: Sep. 9, 2025

(54) CARBON NANO TUBE-POLYMER HYBRID NANOCOMPOSITE ELECTRODES FOR POROUS POLYDIMETHYLSILOXANE SPONGE-BASED FLEXIBLE TRIBOELECTRIC NANOGENERATORS

(71) Applicant: University of Seoul Industry Cooperation Foundation, Seoul (KR)

(72) Inventor: Hyeok Kim, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 176 days.

(21) Appl. No.: 18/092,175

(22) Filed: Dec. 30, 2022

(65) Prior Publication Data
US 2023/0216434 A1    Jul. 6, 2023

(30) Foreign Application Priority Data
Dec. 31, 2021   (KR) ................. 10-2021-0194038

(51) Int. Cl.
*H02N 1/04*    (2006.01)
(52) U.S. Cl.
CPC .................................. *H02N 1/04* (2013.01)
(58) Field of Classification Search
CPC ....................................................... H02N 1/04
(Continued)

(56) References Cited

U.S. PATENT DOCUMENTS

| | | | |
|---|---|---|---|
| 2015/0201837 A1* | 7/2015 | Song | A61B 5/1486 340/870.07 |
| 2016/0033343 A1* | 2/2016 | Park | G01L 1/146 73/862.046 |

(Continued)

FOREIGN PATENT DOCUMENTS

| | | | |
|---|---|---|---|
| CN | 205144556 | * | 4/2016 |
| KR | 101284373 B1 | | 7/2013 |

(Continued)

OTHER PUBLICATIONS

Jian Du et al. "Optimized CNT-PDMS Flexible Composite for Attachable Health-Care Device", Sensors 2020, 20, 4523 (Aug. 13, 2020), total p. 13.

(Continued)

*Primary Examiner* — Ahmed Elnakib
(74) *Attorney, Agent, or Firm* — NKL Law; Jae Youn Kim

(57) ABSTRACT

A flexible triboelectric nanogenerator (TENG) has attracted much attention due to its environmentally friendly, practical, and cost-producing advantages. Flexible electrodes are required to fabricate a fully flexible TENG device. Electrical properties of porous polydimethylsiloxane (PDMS) sponge-based flexible TENGs with two types of flexible electrodes including copper and carbon nanotube (CNT)-PDMS were compared. Output voltages and maximum power densities of the PDMS sponge-based flexible TENGs with the copper and CNT-PDMS electrodes were compared. The voltage and the power density of the PDMS sponge-based flexible TENG with the CNT-PDMS electrodes were shown to be improved compared to the copper electrodes. The output voltage and the maximum power density of the PDMS sponge-based flexible TENG with the CNT-PDMS electrodes increased 4 times and 7 times, respectively, compared to the PDMS sponge-based flexible TENG with the copper electrodes because electrical conductivity is higher and electricity more stably flows in CNTs than in copper.

1 Claim, 3 Drawing Sheets

(58) Field of Classification Search
USPC .................................................. 310/309, 310
See application file for complete search history.

(56) References Cited

U.S. PATENT DOCUMENTS

2022/0146340 A1* 5/2022 Arias ..................... A43B 17/00
2023/0216434 A1* 7/2023 Kim ........................ H02N 1/04
310/310

FOREIGN PATENT DOCUMENTS

KR 20160066606 A 6/2016
KR 20210036183 A 4/2021

OTHER PUBLICATIONS

Wang, Z.L., 2013. Triboelectric nanogenerators as new energy technology for self-powered systems and as active mechanical and chemical sensors. ACS Nano, 7(11), pp. 9533-9557.
Wang, Z.L. and Song, J., 2006. Piezoelectric nanogenerators based on zinc oxide nanowire arrays. Science, 312 (5771), pp. 242-246.
Lee, J.H., Kim, J., Kim, T.Y., AlHossain, M.S., Kim, S.W. and Kim, J.H., 2016. All-in-one energy harvesting and storage devices. Journal of Materials Chemistry A, 4(21), pp. 7983-7999.
Yang, B., Lee, C., Kee, W.L. and Lim, S.P., 2010. Hybrid energy harvester based on piezoelectric and electromagnetic mechanisms. Journal of Micro/Nanolithography, MEMS, and MOEMS, 9(2), p. 023002.
Choi, Y.M., Lee, M.G. and Jeon, Y., 2017. Wearable biomechanical energy harvesting technologies. Energies, 10(10), p. 1483.
Vincent, P., Song, D.S., Kwon, H.B., Kim, D.K., Jung, J.H., Kwon, J.H., Choe, E., Kim, Y.R., Kim, H. and Bae, J.H., 2018. Towards maximizing the haze effect of electrodes for high efficiency hybrid tandem solar cell. Applied Surface Science, 432, pp. 262-265.
Fan, F.R., Tian, Z.Q. and Wang, Z.L., 2012. Flexible triboelectric generator. Nano Energy, 1(2), pp. 328-334.
Seol, M.L., Han, J.W., Moon, D.I., Yoon, K.J., Hwang, C.S. and Meyyappan, M., 2018. All-printed triboelectric hanogenerator. Nano Energy, 44, pp. 82-88.
Wang, Z.L., Chen, J. and Lin, L., 2015. Progress in triboelectric nanogenerators as a new energy technology and self-powered sensors. Energy & Environmental Science, 8(8), pp. 2250-2282.
Zhao, K., Wang, Z.L. and Yang, Y., 2016. Self-powered wireless smart sensor node enabled by an ultrastable, highly efficient, and superhydrophobic-surface-based triboelectric nanogenerator. ACS Nano, 10(9), pp. 9044-9052.
Pei, L., Lu, C., Zhao, X., Zhang, L., Cheng, K., Michal, G. and Tieu, K., 2015. Brittle versus ductile behaviour of hanotwinned copper: A molecular dynamics study. Acta Materialia, 89, pp. 1-13.
Jung, H.C., Moon, J.H., Baek, D.H., Lee, J.H., Choi, Y.Y., Hong, U.S. and Lee, S.H., 2012. CNT/PDMS composite lexible dry electrodes for long-term ECG monitoring. IEEE Transactions on Biomedical Engineering, 59(5), pp. 1472-1479.
Ma, P.C. and Kim, J.K., 2011. Carbon Nanotubes for Polymer Reinforcement, CRC press.
Ijima, S., 1991. Helical microtubules of graphitic carbon. Nature, 354(6348), pp. 56-58.
Paul, J., Sindhu, S., Nurmawati, M.H. and Valiyaveettil, S., 2006. Mechanics of prestressed polydimethylsiloxane-carbon nanotube composite. Applied Physics Letters, 89(18), p. 184101.
Niu, S. and Wang, Z.L., 2015. Theoretical systems of triboelectric nanogenerators. Nano Energy, 14, pp. 161-192.
Lin, L., Xie, Y., Wang, S., Wu, W., Niu, S., Wen, X. and Wang, Z.L., 2013. Triboelectric active sensor array for self-powered static and dynamic pressure detection and tactile imaging. ACS Nano, 7(9), pp. 8266-8274.
Liu, X.M., Dong Huang, Z., Woon Oh, S., Zhang, B., Ma, P. C., Yuen, M.M.F. and Kim, J.K., 2012. Carbon nanotube (CNT)-based composites as electrode material for rechargeable Li-ion batteries: A review. Composites Science and Technology, 72(2), pp. 121-144.

* cited by examiner

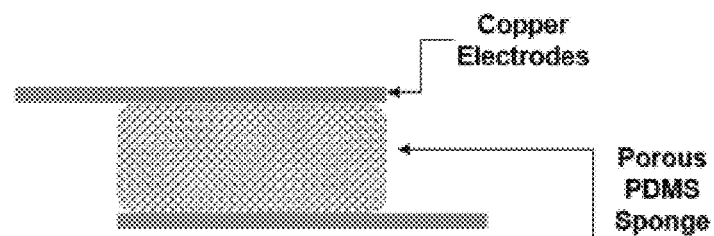
FIG. 1(a)
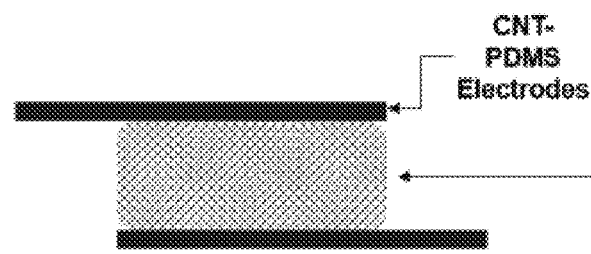
FIG. 1(b)
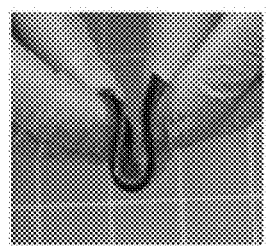 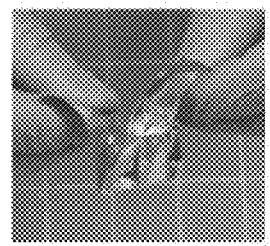
FIG. 1(c)    FIG. 1(d)

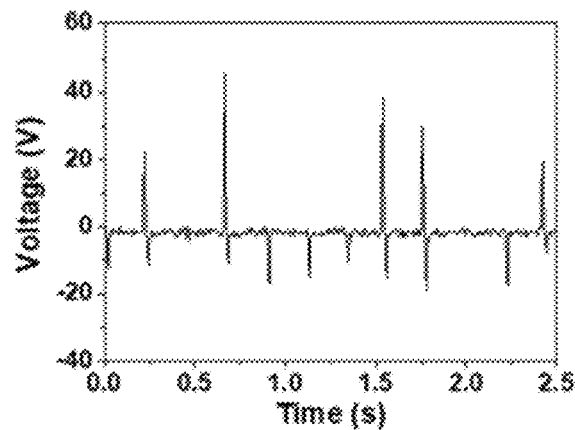
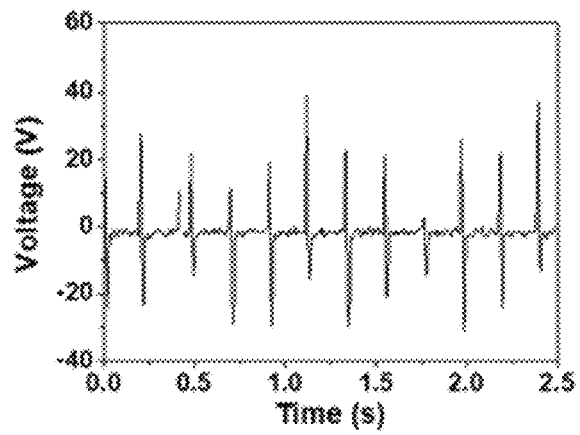
FIG. 3(a)  FIG. 3(b)
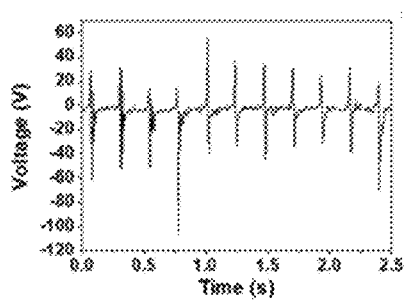
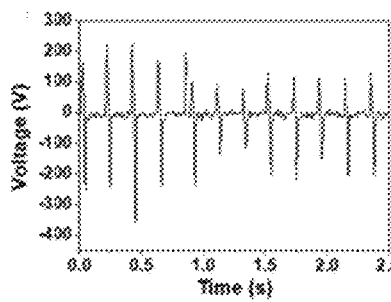
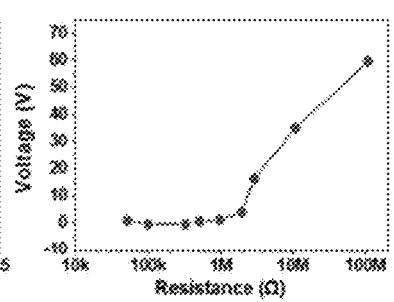
FIG. 4(a)  FIG. 4(b)  FIG. 4(c)

CARBON NANO TUBE-POLYMER HYBRID NANOCOMPOSITE ELECTRODES FOR POROUS POLYDIMETHYLSILOXANE SPONGE-BASED FLEXIBLE TRIBOELECTRIC NANOGENERATORS

BACKGROUND

1. Field of the Invention

The present disclosure relates to a triboelectric nanogenerator electrode. Specifically, the present disclosure relates to a porous sponge-based flexible triboelectric nanogenerator electrode.

2. Discussion of Related Art

With the rapid development of wearable electronic devices, a technology that can convert various types of energy into electrical energy is essential for harvesting various types of wasted energy found in our lives. For this reason, various types of energy harvesters such as a photovoltaic cell, a triboelectric nanogenerator (TENG), a microgenerator, a thermoelectric generator, and the like have been developed.

Among them, TENGs have attracted great attention as viable energy harvesting devices because of simplicity in its preparation process, low costs, and high power density. TENGs have been studied a lot because they can convert mechanical energy into electrical energy through a triboelectric effect.

However, metal electrodes-based TENG devices have a problem in flexibility when a large strain is applied. While copper electrodes are mainly used, their low mechanical flexibility is low, which is an obstacle for application in next-generation electronic devices such as a wearable device.

RELATED ART DOCUMENTS

Non-Patent Documents

1. Wang, Z. L., 2013. Triboelectric nanogenerators as new energy technology for self-powered systems and as active mechanical and chemical sensors. ACS Nano, 7(11), pp. 9533-9557.
2. Wang, Z. L. and Song, J., 2006. Piezoelectric nanogenerators based on zinc oxide nanowire arrays. Science, 312(5771), pp. 242-246.
3. Lee, J. H., Kim, J., Kim, T. Y., AlHossain, M. S., Kim, S. W. and Kim, J. H., 2016. All-in-one energy harvesting and storage devices. Journal of Materials Chemistry A, 4(21), pp. 7983-7999.
4. Yang, B., Lee, C., Kee, W. L. and Lim, S. P., 2010. Hybrid energy harvester based on piezoelectric and electromagnetic mechanisms. Journal of Micro/Nanolithography, MEMS, and MOEMS, 9(2), p. 023002.
5. Choi, Y. M., Lee, M. G. and Jeon, Y., 2017. Wearable biomechanical energy harvesting technologies. Energies, 10(10), p. 1483.
6. Vincent, P., Song, D. S., Kwon, H. B., Kim, D. K., Jung, J. H., Kwon, J. H., Choe, E., Kim, Y. R., Kim, H. and Bae, J. H., 2018. Towards maximizing the haze effect of electrodes for high efficiency hybrid tandem solar cell. Applied Surface Science, 432, pp. 262-265.
7. Fan, F. R., Tian, Z. Q. and Wang, Z. L., 2012. Flexible triboelectric generator. Nano Energy, 1(2), pp. 328-334.
8. Seol, M. L., Han, J. W., Moon, D. I., Yoon, K. J., Hwang, C. S. and Meyyappan, M., 2018. All-printed triboelectric nanogenerator. Nano Energy, 44, pp. 82-88.
9. Wang, Z. L., Chen, J. and Lin, L., 2015. Progress in triboelectric nanogenerators as a new energy technology and self-powered sensors. Energy & Environmental Science, 8(8), pp. 2250-2282.
10. Zhao, K., Wang, Z. L. and Yang, Y., 2016. Self-powered wireless smart sensor node enabled by an ultrastable, highly efficient, and superhydrophobic-surface-based triboelectric nanogenerator. ACS Nano, 10(9), pp. 9044-9052.
11. Pei, L., Lu, C., Zhao, X., Zhang, L., Cheng, K., Michal, G. and Tieu, K., 2015. Brittle versus ductile behaviour of nanotwinned copper: A molecular dynamics study. Acta Materialia, 89, pp. 1-13.
12. Jung, H. C., Moon, J. H., Baek, D. H., Lee, J. H., Choi, Y. Y., Hong, J. S. and Lee, S. H., 2012. CNT/PDMS composite flexible dry electrodes for long-term ECG monitoring. IEEE Transactions on Biomedical Engineering, 59(5), pp. 1472-1479.
13. Ma, P. C. and Kim, J. K., 2011. Carbon Nanotubes for Polymer Reinforcement, CRC press.
14. Iijima, S., 1991. Helical microtubules of graphitic carbon. Nature, 354(6348), pp. 56-58.
15. Paul, J., Sindhu, S., Nurmawati, M. H. and Valiyaveettil, S., 2006. Mechanics of prestressed polydimethylsiloxane-carbon nanotube composite. Applied Physics Letters, 89(18), p. 184101.
16. Niu, S. and Wang, Z. L., 2015. Theoretical systems of triboelectric nanogenerators. Nano Energy, 14, pp. 161-192.
17. Lin, L., Xie, Y., Wang, S., Wu, W., Niu, S., Wen, X. and Wang, Z. L., 2013. Triboelectric active sensor array for self-powered static and dynamic pressure detection and tactile imaging. ACS Nano, 7(9), pp. 8266-8274.
18. Liu, X. M., Dong Huang, Z., Woon Oh, S., Zhang, B., Ma, P. C., Yuen, M. M. F. and Kim, J. K., 2012. Carbon nanotube (CNT)-based composites as electrode material for rechargeable Li-ion batteries: A review. Composites Science and Technology, 72(2), pp. 121-144.

SUMMARY OF THE INVENTION

The present disclosure is directed to providing a triboelectric nanogenerator (TENG) having improved flexibility by using a flexible electrode.

In order to solve the above-described problem, in the present disclosure, a TENG including porous polydimethylsiloxane (PDMS) sponge and carbon nanotube (CNT)-PDMS electrodes was fabricated.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIGS. 1(a)-1(d) include schematic diagrams of a polydimethylsiloxane (PDMS) sponge-based flexible triboelectric nanogenerator (TENG) and photographs of a flexibility test;

FIGS. 3(a) and 3(b) include graphs showing output voltages of air-based flexible TENGs with copper and carbon nanotube (CNT)-PDMS electrodes, respectively; and FIGS. 4(a)-4(c) include graphs showing output voltages of the PDMS sponge-based flexible TENGs with the copper electrodes and the CNT-PDMS electrodes.

DETAILED DESCRIPTION OF EXEMPLARY EMBODIMENTS

Figures 2A, 2B:
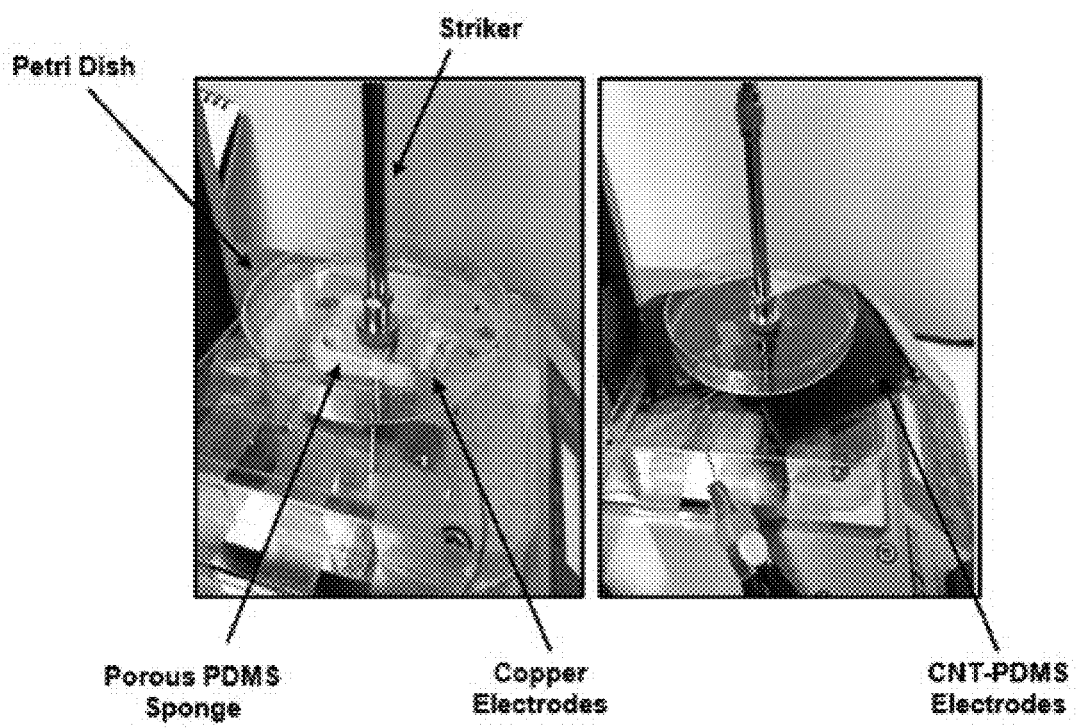
FIGS. 2(a) and 2(b) include photographs in which electrical properties are measured by applying mechanical pressure to the PDMS sponge-based flexible TENG.

Terms used in the present specification will be briefly described, and one embodiment of the present invention will be described in detail. General terms currently and widely used as much as possible are selected as the terms used in the present specification while considering functions in the present disclosure, but the terms used in the present specification may be changed according to the intention of those skilled in the art, a precedent, the emergence of a new technology, and the like. Further, in a specific case, there are also terms arbitrarily selected by the applicant, and in this case, meanings will be described in detail in the description of the invention. Accordingly, the terms used in the present specification should be defined based on not simply names of the terms but the meanings of the terms and the overall content of the present disclosure.

Hereinafter, embodiments according to the present disclosure will be described in detail with reference to the accompanying drawings.

In the present disclosure, polydimethylsiloxane (PDMS) was chosen because polydimethylsiloxane (PDMS) is a material used in various fields including biomedicine, materials/devices, and the like, and has non-toxic, non-flammable, and flexible properties. Further, PDMS has high elasticity and a large volumetric capacity. Accordingly, PDMS was fabricated into a sponge structure and used as a porous dielectric. A carbon nanotube (CNT)-PDMS electrode has excellent electrical properties, and thus was fabricated to analytically compare its electrical properties with copper electrodes. As a result, the CNT-PDMS electrode improved an output voltage about 4 times and maximum power efficiency about 7 times compared to the copper electrodes.

Experiment

A dielectric was prepared by preparing a spacer in a PDMS sponge form. The PDMS was prepared at a room temperature of about 20° C. and a humidity of about 30% using a Sylgard-184, which is an elastic PDMS kit prepared by Dow Corning (Midland, MI, USA).

The PDMS sponge was used as an active triboelectric layer. For the PDMS, a PDMS solution was prepared by mixing a PDMS base and a curing agent in a plastic beaker in a ratio of 10:1 and stirring the mixture for 20 minutes. Thereafter, the prepared PDMS solution was put in a Petri dish together with brown sugar. Brown sugar is used because it is easy to check whether PDMS is absorbed into the sugar due to brown sugar particles thicker than white sugar particles. After the PDMS was absorbed into the brown sugar, the PDMS was put in an oven and cured for 2 hours at 65° C. The prepared PDMS was dissolved in deionized water at 50° C. to remove the brown sugar.

For the electrodes, copper tapes and multi-walled carbon nanotube (MWCNT)+PDMS were used. The copper tape electrodes were attached to both surfaces of the porous dielectric. The PDMS was prepared by mixing a PDMS base and a curing agent in a plastic beaker in the ratio of 10:1 and stirring the mixture for 20 minutes. For preparation of the CNT-PDMS, PDMS (10 g) and CNTs (0.004 g) were mixed together to have both acceptable conductivity and flexibility. The CNT-DMS was put in a vacuum desiccator to remove air bubbles. Then, the PDMS was put in the oven and cured for 2 hours at 65° C. Thereafter, CNT-PDMS electrodes were attached to both surfaces of the porous PDMS sponge. Properties of the devices were measured with an oscilloscope using a striker.

Result

FIGS. 1(a) and 1(b) show schematic diagrams of the PDMS sponge-based flexible triboelectric nanogenerator (TENG) using the copper electrodes and the CNT-PDMS electrodes. CNTs show excellent mechanical, electrical, and thermal properties. PDMS may be mixed with CNTs to generate highly flexible electrodes. In contrast to conventional commercial electrodes, CNT-PDMS electrodes are flexible and have stretchability.

FIGS. 1(c) and 1(d) show the flexibility of the CNT-PDMS and copper electrodes. A porous PDMS sponge was used as the dielectric to compare the copper electrodes and the CNT-PDMS electrodes.

FIGS. 2(a) and 2(b) show the measurement of electrical properties by applying mechanical pressure to each of the PDMS sponge-based flexible TENGs made of the copper and CNT-PDMS electrodes. When mechanical stress is applied to the PDMS sponge, electrons move and show different poles, and a voltage is generated due to electrostatic induction.

Output voltages of the flexible TENG using the copper electrodes and the PDMS sponge and the flexible TENG using the CNT-PDMS electrodes and the PDMS sponge were measured using a striker. FIGS. 3(a) and 3(b) show the output voltages of the air-based flexible TENG with copper and CNT-PDMS electrodes, respectively. It can be seen that the CNT-PDMS electrodes show a higher voltage than the copper electrodes.

FIG. 4(a) shows the output voltage of the PDMS sponge-based flexible TENG with the copper electrodes. FIG. 4(b) illustrates the output voltage of the PDMS sponge-based flexible TENG with the CNT-PDMS electrodes. An average voltage and standard distribution of the copper electrode-based TENG are 38.1 V and 19.5 V, respectively. An average voltage and standard distribution of the CNT-PDMS electrode-based TENG are 175.1 V and 67.0 V, respectively.

The above result indicates that the flexible TENG fabricated in the present disclosure has reasonable and uniform output voltage performance. Further, the average voltage of the CNT-PDMS electrode-based TENG is shown to be higher than the average voltage of the copper electrode-based TENG.

Positive peak output voltages of the PDMS sponge-based flexible TENGs with the copper electrodes and the CNT-PDMS electrodes were shown to be 55.6 V and 231.2 V, respectively, and negative peak output voltages of the PDMS sponge-based flexible TENGs with the copper electrodes and the CNT-PDMS electrodes were shown to be −106.2 V and −356.2 V, respectively. Compared to a conventional copper electrode-based TENG device, a CNT-PDMS electrode-based TENG device acquired an approximate 4 times increase in output voltage to 231.2V.

FIG. 4(c) shows an output voltage according to load resistance in the PDMS sponge-based flexible TENG. It can be seen that the load resistance and the output voltage of the PDMS sponge-based flexible TENG increase proportionally.

As a result, the PDMS sponge-based flexible TENG shows an improved voltage compared to the air-based flexible TENG. Further, the CNT-PDMS electrode-based TENG showed an improved output voltage compared to the copper electrode-based TENG. As shown in FIGS. 3(a) and 3(b), the CNT electrode shows excellent electrical properties compared to the copper electrode.

Table 1 shows the output voltages and maximum power densities of the PDMS sponge-based flexible TENGs with the copper and CNT-PDMS electrodes. The output voltages of the PDMS sponge-based flexible TENGs with the copper and CNT-PDMS electrodes are shown in FIGS. 3(a) and 3(b).

TABLE 1

| Device | Output voltage (V) | Maximum power density (mW/m$^2$) |
| --- | --- | --- |
| Copper-based TENGs | 55.6 | 0.79 |
| CNT-PDMS-based TENGs | 231.2 | 5.7 |

In the case of the copper-based TENG, the maximum power density is up to 0.79 mW/m$^2$. In the case of the CNT-PDMS electrode-based TENG, the maximum power density is up to 5.7 mW/m$^2$. As a result, the CNT-PDMS electrode has about 7 times higher power efficiency than the copper electrode.

This means that the CNT-PDMS electrode-based TENG has higher power efficiency at the same volume compared to the copper electrode-based TENG. Due to such properties, it is expected that the CNT-PDMS electrode-based TENG is suitable for use in energy storage, biological applications, and other application fields. As a result, since a TENG having high elasticity may be fabricated, it is expected that the TENG is easily applied to wearable electronics such as a fiber linings, insoles, knee pads, and the like.

CONCLUSION

In order to prepare a flexible device, it is important to implement flexible electrodes (both ends) as well as an elastomer which generates surface electrostatic charges. The flexible TENGs were prepared using the CNT-PDMS electrodes and the copper electrodes together with the porous PDMS sponges using the flexible properties of PDMS and the excellent electrical properties of CNTs. The voltages and the power densities of the prepared TENGs were measured and compared.

The measured positive peak output voltages of the copper and CNT-PDMS electrode-based TENGs are 55.6 V and 231.2 V, respectively. The measured negative peak output voltages of the copper and CNT-PDMS electrode-based TENGs are −106.2 V and −356.2 V, respectively. As a result, it was confirmed that the output voltages increased about 4 times. Further, the maximum power densities of the copper and CNT-PDMS electrode-based TENGs were 0.79 mW/m$^2$ and 5.7 mW/m$^2$, respectively. Accordingly, the CNT-PDMS electrode has about 7 times higher power efficiency than the copper electrode. As a result, the PDMS sponge-based flexible TENG using CNT-PDMS electrodes has higher electrical properties at a smaller volume. According to the present disclosure, it is expected that the TENG is applied to the wearable electronic products such as fiber linings, insoles, knee pads, and the like to open up the possibility of preparing TENGs having high flexibility and elasticity.

According to the present disclosure, a triboelectric nanogenerator having flexibility can be prepared.

Further, according to the present disclosure, a triboelectric nanogenerator having improved output voltage and power density can be prepared.

The above-described preferred embodiments of the present disclosure have been disclosed for illustrative purposes, those skilled in the art may perform various modifications, changes, and additions within the spirit and scope of the present disclosure, and it should be seen that these modifications, changes, and additions fall within the scope of the above-described claims.

Since those skilled in the art may perform make various substitutions, modifications, and changes without departing from the technical spirit of the present disclosure, the present disclosure is not limited by the above-described embodiments and accompanying drawings.

What is claimed is:
1. A triboelectric nanogenerator (TENG) comprising:
a triboelectric layer formed of a polydimethylsiloxane (PDMS) material, wherein the triboelectric layer has a porous sponge structure; and
flexible electrodes coupled to an upper surface and a lower surface of the triboelectric layer,
wherein the flexible electrodes are formed of a carbon nanotube (CNT)-PDMS material,
wherein each of the flexible electrodes is formed of a material in which the CNT and the PDMS are mixed in a weight ratio of 0.004:10,
wherein an average voltage and standard distribution of the CNT-PDMS electrode-based TENG are 175.1 V and 67.0 V, and
wherein positive peak output voltages and negative peak output voltages of the CNT-PDMS electrode-based TENG are 231.2 V and −356.2 V.

* * * * *